US010910934B2

(12) United States Patent
Mostovoy et al.

(10) Patent No.: US 10,910,934 B2
(45) Date of Patent: Feb. 2, 2021

(54) ELECTRIC MOTOR

(71) Applicant: VASTECH HOLDINGS LTD., London (GB)

(72) Inventors: Alexander Mostovoy, Ashkelon (IL); Victor Shlakhetski, Ashkelon (IL)

(73) Assignee: Vastech Holdings Ltd., London (GB)

( * ) Notice: Subject to any disclaimer, the term of this patent is extended or adjusted under 35 U.S.C. 154(b) by 0 days.

(21) Appl. No.: 15/767,269

(22) PCT Filed: Oct. 6, 2016

(86) PCT No.: PCT/IL2016/051086
§ 371 (c)(1),
(2) Date: Apr. 10, 2018

(87) PCT Pub. No.: WO2017/064699
PCT Pub. Date: Apr. 20, 2017

(65) Prior Publication Data
US 2018/0375414 A1  Dec. 27, 2018

(30) Foreign Application Priority Data
Oct. 15, 2015 (GB) .................................. 1518249.6

(51) Int. Cl.
H02K 7/116 (2006.01)
H02K 23/40 (2006.01)
(Continued)

(52) U.S. Cl.
CPC ........... *H02K 23/405* (2013.01); *H02K 7/116* (2013.01); *H02K 23/68* (2013.01); *H02K 99/20* (2016.11)

(58) Field of Classification Search
CPC ...... H02K 23/405; H02K 7/116; H02K 23/68; H02K 99/20; H02K 1/141; H02K 1/24; H02K 13/003; H02K 13/02; H02K 19/04
(Continued)

(56) References Cited
U.S. PATENT DOCUMENTS 2,437,871 A    2/1943  Wood
2,705,762 A    4/1955  Pile
(Continued)

FOREIGN PATENT DOCUMENTS

CN    102710083 B    2/2014
CN    103646757 A    3/2014
(Continued)

OTHER PUBLICATIONS

European Supplementary Search Report with Annex dated Mar. 27, 2019 in European Patent Application EP16855055.
(Continued)

*Primary Examiner* — John K Kim
(74) *Attorney, Agent, or Firm* — Williams Mullen; F. Michael Sajovec

(57) ABSTRACT

The invention relates to an electric motor comprising: (A) a ring-like rotor which comprises: a plurality of electromagnets that are equi-angularly spaced and equi-radially disposed in a ring-like manner; and, (B) a stator which comprises: a plurality of solenoids that are equi-angularly spaced and equi-radially disposed, each of said solenoids having a solenoid core, which in turn has a rectangular shape in cross-section, and a cavity; and a solenoid coil within each of said solenoids; wherein said electromagnets are arranged such that they can move through said cavities of the solenoid cores in a rotational manner, wherein negative and positive ends, respectively, of the plurality of said electromagnets are connected in parallel to respective negative and positive
(Continued)

peripheral strips, and wherein current to the electromagnet coils is supplied from a power supply via two brushes, respectively to the negative and positive strips.

5 Claims, 5 Drawing Sheets

(51) Int. Cl.
*H02K 23/68* (2006.01)
*H02K 99/00* (2014.01)

(58) Field of Classification Search
USPC .................................................... 310/83, 232
See application file for complete search history.

(56) References Cited

U.S. PATENT DOCUMENTS

| | | | |
|---|---|---|---|
| 3,611,230 A | 10/1971 | Maake | |
| 3,936,663 A | 2/1976 | Walter | |
| 4,115,040 A | 9/1978 | Knorr | |
| 4,291,248 A | 9/1981 | Rainbolt | |
| 4,381,466 A | 4/1983 | Leanes | |
| 5,105,111 A * | 4/1992 | Luebke | H02K 25/00 310/154.23 |
| 5,144,179 A * | 9/1992 | Hilal | H02K 29/12 310/178 |
| 5,376,862 A | 12/1994 | Grald | |
| 5,633,555 A | 5/1997 | Ackerman | |
| 5,637,973 A | 6/1997 | Hirai et al. | |
| 5,798,591 A | 8/1998 | Lillington et al. | |
| 6,118,193 A * | 9/2000 | Morris | E02D 17/18 310/113 |
| 6,252,317 B1 | 6/2001 | Scheffer et al. | |
| 6,889,004 B2 | 5/2005 | Li | |
| 7,503,104 B2 | 3/2009 | Schmidt | |
| 7,508,104 B2 | 3/2009 | Schmidt | |
| 7,723,886 B2 | 5/2010 | Huber | |
| 8,221,247 B2 | 7/2012 | Lai | |
| 8,446,060 B1 | 5/2013 | Lugg | |
| 8,808,096 B2 | 8/2014 | Atkins | |
| 8,994,238 B2 | 3/2015 | Kamibayashi | |
| 9,013,081 B2 | 4/2015 | Atallah | |
| 9,385,581 B2 | 7/2016 | Enomoto | |
| 2009/0323208 A1 | 12/2009 | Kurosawa | |
| 2010/0295397 A1 * | 11/2010 | Dowis | H02K 13/003 310/90 |
| 2011/0037333 A1 | 2/2011 | Kais | |
| 2012/0007458 A1 | 1/2012 | Rozinsky et al. | |
| 2012/0262017 A1 | 10/2012 | Mengibar Rivas | |
| 2012/0280586 A1 | 11/2012 | Englert | |
| 2013/0011317 A1 | 1/2013 | Englert | |
| 2013/0123026 A1 | 5/2013 | Purdy | |
| 2014/0368095 A1 * | 12/2014 | Kamibayashi | H02K 21/12 310/75 R |
| 2015/0035403 A1 * | 2/2015 | Shlakhetski | H02P 6/14 310/156.43 |
| 2015/0076948 A1 | 3/2015 | Katou | |
| 2015/0364978 A1 * | 12/2015 | Petkanchin | C03C 17/04 310/71 |
| 2018/0375414 A1 * | 12/2018 | Mostovoy | H02K 99/20 |

FOREIGN PATENT DOCUMENTS

| | | |
|---|---|---|
| CN | 103730997 A | 4/2014 |
| DE | 26 50 510 A1 | 5/1977 |
| DE | 3732766 | 4/1988 |
| DE | 198 52 650 A1 | 5/2000 |
| EP | 0 422 539 A1 | 4/1991 |
| EP | 0779599 A1 | 5/1997 |
| EP | 3363107 | 8/2018 |
| FR | 1487492 | 7/1967 |
| FR | 2766029 | 1/1999 |
| FR | 2782419 A1 | 2/2000 |
| GB | 2240666 A | 7/1991 |
| JP | 2015061422 A | 4/1988 |
| JP | HO2-139461 A | 11/1990 |
| JP | 2000083365 A | 3/2002 |
| JP | 2003-199283 A | 7/2003 |
| JP | 2012205348 A | 10/2012 |
| JP | 2013-140400 A1 | 9/2013 |
| RU | 94044956 A | 10/1996 |
| WO | 8101633 | 6/1981 |
| WO | 95/03646 A1 | 2/1995 |
| WO | 9607611 | 3/1996 |
| WO | 00/31858 A1 | 6/2000 |
| WO | 2005/124967 A1 | 12/2005 |
| WO | 2013/140400 A1 | 9/2013 |

OTHER PUBLICATIONS

International Preliminary Report on Patentability for PCT/IL2016/051086, 45 pages, dated Dec. 10, 2017.
Written Opinion of the International Searching Authority, 6 pages, dated Feb. 5, 2017.
International Search Report for PCT/IL2016/051086, 5 pages, dated Feb. 5, 2017.
Intellectual Property India, Examination Report for in Patent Application No. 201837016805, dated Jun. 30, 2020.
IP Australia Examination Report for AU Patent Application No. 2016339148, dated Mar. 16, 2020.
National Intellectual Property Administration of the People's Republic of China Notification of the First Office Action for CN Application No. 201680060194.1 dated May 28, 2019.
Brazilian Cited References and Information Translation of Brazilian Office Action for BR112018007186-2 dated Aug. 4, 2020.
European Supplementary Search Report with Annex dated Mar. 27, 2019 in EP App. 16655055.
Notice of Reasons for Refusal for JP Patent Application No. 2018-519491 dated Jul. 8.

* cited by examiner

ELECTRIC MOTOR

FIELD OF INVENTION

The invention relates to the field of electric motors. More particularly, the invention relates to an electric motor which includes solenoids at the stator, and a plurality of electromagnets at the rotor.

BACKGROUND OF THE INVENTION

Electric motors of the rotational type are well known, and have been widely used for many years now for converting electrical energy to mechanical energy. A typical electric motor comprises a rotor and a stator.

The rotor is the moving part of the motor, and it comprises the turning shaft which delivers a rotational moment to the load. The rotor typically comprises conductors that carry current, which in turn produces an electromagnetic field that interacts with the magnetic field of the stator to generate the forces that cause rotation of the shaft. In another alternative, the rotor comprises permanent magnets, while the stator comprises the conductors.

The stator, in turn, is the stationary part of the motor's electromagnetic circuit, and, as said, comprises either windings or permanent magnets. The stator core is typically made up of many thin metal sheets, called laminations. The laminations are used to reduce energy losses that would otherwise result if a solid core were used.

Electric motors are also used in a reversed functionality to convert mechanical energy to electrical energy, and in such a case, the electric motor is in fact an electric generator.

WO 2013/140400 discloses an electric motor which comprises a plurality of solenoids at the stator, and a plurality of permanent magnets at the rotor. The solenoids of the stator are radially disposed and equi-angularly spaced on a circular plane; each of the solenoids has a void through which permanent magnets of the rotor move. The rotor in turn comprises said plurality of magnets that are arranged in a substantially ring-like structure, in which said magnets are equi-angularly spaced one another. The gaps between adjacent magnets (when such gaps exist), are preferably filled with high permeability material. In any case, the magnets and the high permeability material (when exist) form a ring-like structure. Current is supplied simultaneously to all the solenoids to push or pull all the permanent magnets in a specific direction relative to the solenoids, thereby to cause rotation of the magnet ring. In an embodiment of WO2013/140400, several additional ring-shaped layers are provided above and below the ring-shaped layer of the permanent-magnets, all of said layers altogether rotationally move through the solenoid voids. One of said additional ring-like layers of WO 2013/140400 is a tooth-ring, which transfers the rotational moment of the permanent-magnets layer (and the rest of the layers above and below it) to a tooth disk (mechanical gear), which upon its rotation turns the shaft of the motor which is rigidly attached to it.

Co-pending application GB 1511226.1 (published as WO 2016/207877) discloses an electric motor, comprising: (A) a rotor which comprises: (a) a co-centric shaft and disk; and (b) a plurality of permanent magnets that are equi-angularly spaced and equi-radially disposed on said disk; and, (B) a stator which comprises: (c) a plurality of solenoids that are equi-angularly spaced and equi-radially disposed, each of said solenoids having a solenoid core, which in turn has a rectangular shape in cross-section, a cavity, and a disk slot; and (d) a coil within each of said solenoids; wherein said rotor disk is positioned within said solenoid slots, and said permanent magnets are arranged such that they can pass through said cavities of the solenoid cores in a rotational manner, when said rotor disk is rotated. Current is supplied to the solenoids to simultaneously push or pull the permanent magnets in a specific direction, thereby to cause rotation of the magnets, and in fact rotation of the rotor disk.

As noted, the electric motors of both WO 2013/140400 and GB 1511226.1 comprise, respectively, permanent magnets at their rotor. Permanent magnets, however, are relatively expensive, significantly more expensive compared to electromagnets. It is therefore desirous to replace the permanent magnets in the motors of WO 2013/140400 and GB 1511226.1 by electromagnets.

In another aspect, in both of the motors of WO 2013/140400 and GB 1511226.1 there is a necessity to periodically (i.e., several times during each cycle of the disk) switch the direction of the current which is supplied to the solenoid coils in order to alter respectively the electromagnetic field direction. Obviously, there is no way to alter the poles of permanent magnets, therefore the alteration of the current direction is in fact the only way to maintain the rotation.

It is therefore an object of the present invention to enable a significant reduction in the costs of solenoid-magnet type motors, such as those disclosed in WO 2013/140400 and GB 1511226.1.

It is another object of the invention to enable more flexibility in the manner of causing rotation of solenoid-magnet type motors, such as those disclosed in WO 2013/140400 and GB 1511226.1.

Other object and advantages of the invention will become apparent as the description proceeds.

SUMMARY OF THE INVENTION

The invention relates to an electric motor comprising: (A) a ring-like rotor which comprises: a plurality of electromagnets that are equi-angularly spaced and equi-radially disposed in a ring-like manner; and, (B) a stator which comprises: a plurality of solenoids that are equi-angularly spaced and equi-radially disposed, each of said solenoids having a solenoid core, which in turn has a rectangular shape in cross-section, and a cavity; and a solenoid coil within each of said solenoids; wherein said electromagnets are arranged such that they can move through said cavities of the solenoid cores in a rotational manner, wherein negative and positive ends, respectively, of the plurality of said electromagnets are connected in parallel to respective negative and positive peripheral strips, and wherein current to the electromagnet coils is supplied from a power supply via two brushes, respectively to the negative and positive strips.

In an embodiment of the invention, the rotor is a multi-layer motor, wherein one of the layers is a tooth-ring, and wherein a rotational moment from the rotor is conveyed from the tooth ring to a gear, to which a shaft is rigidly attached.

In another embodiment of the invention, the plurality of electromagnets are mounted on a rotational disk which is in turn co-centric with a shaft, wherein said rotor disk is positioned and rotatable within respective disk slots at each of the solenoids.

The current from the power supply to the electromagnet coils is a DC current, while a current to the solenoid coils is alternating current. Alternatively, the current from the power supply to the electromagnet coils is alternating current, while the current to the solenoid coils is a DC current.

DETAILED DESCRIPTION OF PREFERRED EMBODIMENTS

As noted above, motors that combine use of solenoids and permanent magnets, more specifically, motors in which the permanent magnets move through voids or cavities within the solenoids (hereinafter this type of motor is referred to as "solenoid-permanent magnets type motors"), such as those disclosed in WO 2013/140400 and GB 1511226.1, are relatively expensive, particularly due to the use of expensive permanent magnets. Moreover, their operation requires frequent alteration of the direction of the electromagnetic field, which can be made only by altering the current direction to the solenoids.

Figure 1:
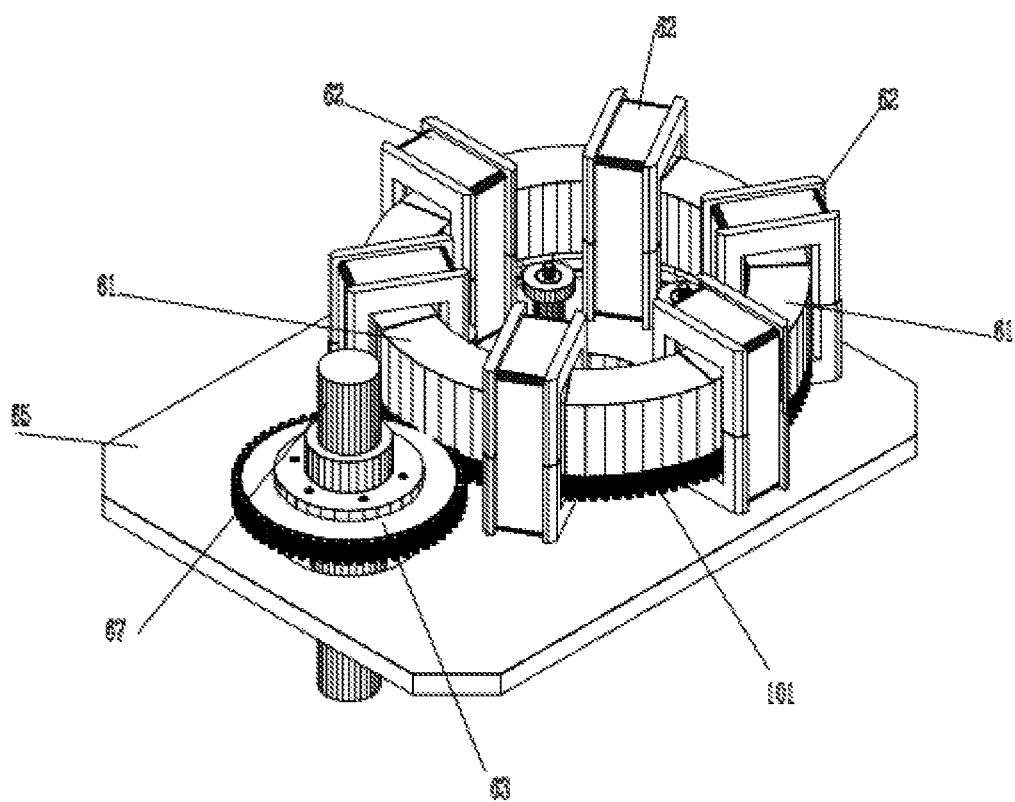
FIG. 1 shows the general structure of the motor of WO 2013/140400.

FIG. 1 shows the general structure of the motor of WO 2013/140400. The motor comprises a stator having a plurality of solenoids 62, each having a void, and a rotor which comprises a plurality of permanent magnets 61 that are arranged in a ring-type structure. Although not shown in FIG. 1, a rod of high permissible material is disposed between any two adjacent magnets 23 to complete the ring structure. Upon the provision of current to the coils of the solenoids, and periodically altering the direction of the current to the solenoids, the ring structure of the rotor rotates. The rotor also comprises a toothed-ring 101, which transfers the rotation moment to gear 63 and shaft 67. The entire motor is supported by base 65.

Figure 2:
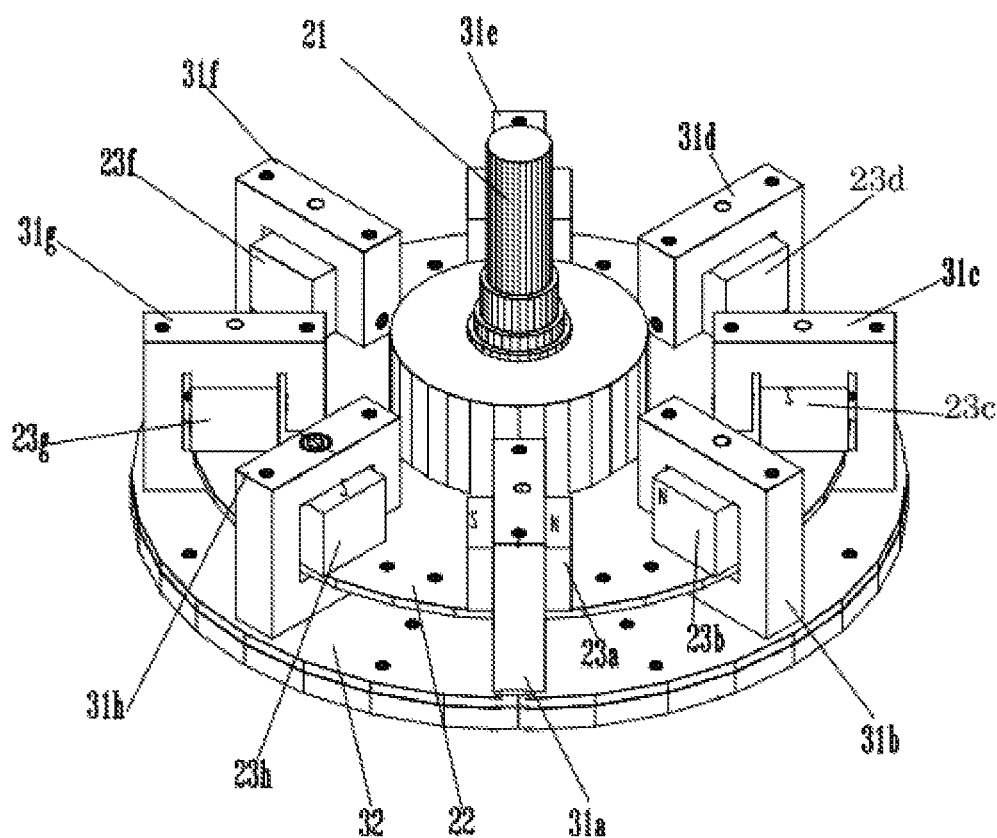
FIG. 2 shows the general structure of the motor of GB 1511226.1.
Figure 3:
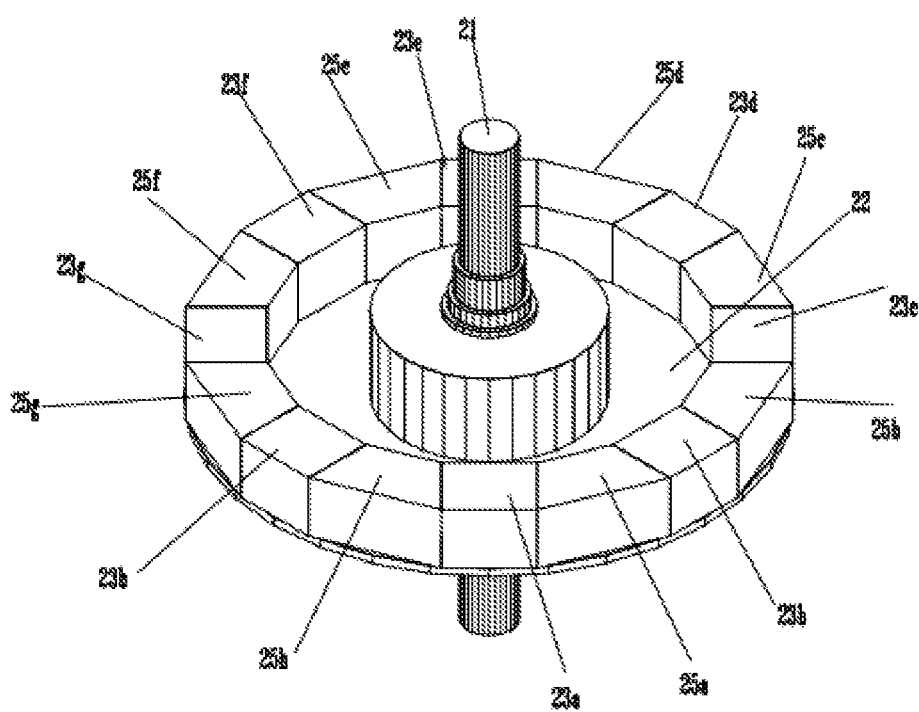
FIG. 3 shows the rotor structure the motor of WO 2013/140400.

FIG. 2 shows the general structure of the motor of GB 1511226.1. The motor comprises a stator having a plurality of solenoids 31a-31h, each having a cavity, and a rotor which comprises a plurality of permanent magnets 23a-23h that are arranged in a ring-type structure (the ring structure is not clearly shown in FIG. 2, but is seen in FIG. 3). The permanent magnets 23 that are arranged in a ring-type structure are positioned on supporting disk 22. As noted, although not shown in FIG. 2, a ferromagnetic (e.g., iron) rod is disposed between any two adjacent magnets 23 to complete the ring structure. Upon appropriate activation of the solenoids 31 by a supply of current (whose direction is also timely alternated), the rotor, namely disk 22 rotates. The rotor also comprises shaft 21, which is rigidly attached to the disk 22. The entire motor is supported by base 32.

FIG. 3 shows the rotor structure of the motor of WO 2013/140400 (without disk 22 which is removed for the sake of clarity), where the ferromagnetic (e.g., iron) rods 25a-25h that are positioned between any pair of adjacent permanent magnets are also shown.

The inventors of the present invention have found that the costs of such "solenoid-permanent magnets type motors" can be significantly reduced by replacing each of the permanent magnets at the rotor, by a suitable electromagnet.

Figure 4:
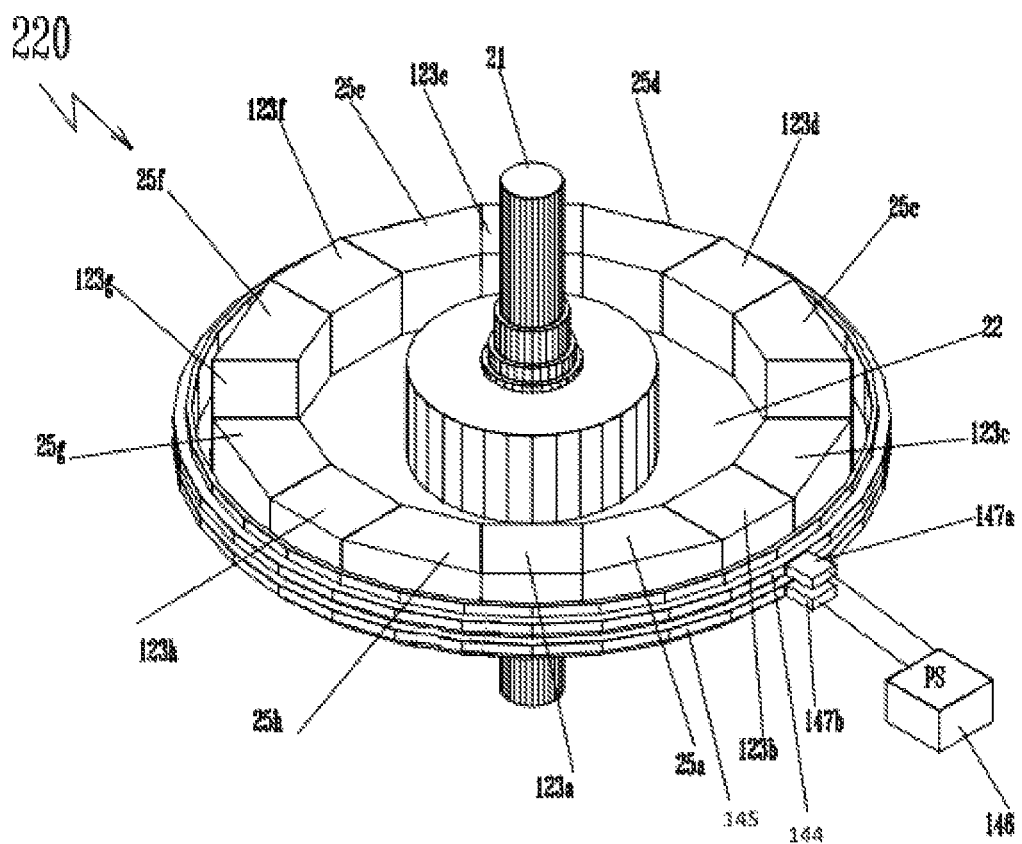
FIG. 4 shows a rotor for a solenoid-electromagnet type motor according to a first embodiment of the present invention.

FIG. 4 shows a rotor for a solenoid-electromagnet type motor according to the present invention. The rotor is substantially identical to the rotor of FIG. 3, however, each of the magnets 23a-23h is replaced by an electromagnet 123a-123h, respectively. Each of the electromagnets 123 comprises one or more coils (not shown in the figure for the sake of brevity) that are wound around an iron (preferably laminated) core. As is conventional, each coil has two ends respectively for the current supply, these coil ends will be referred herein for the sake of brevity as "positive" and "negative" ends of the coil. All of the positive ends of the coils of the electromagnets 123 are connected together to a peripheral "positive" metal strip 144, and similarly all of the negative ends of the coils of electromagnets 123 are connected together to a peripheral "negative" metal strip 145. In such a manner, all the coils of the electromagnets are in fact connected in parallel. The current supply to the electromagnets 123 of the rotating motor is provided from power supply 146 via a pair of conventional brushes 147a and 147b that are well known in the art. More specifically, the "positive" brush 147a is continuously in contact with the positive strip 144, while the negative brush 147b is continuously in contact with the negative strip 145. In such a manner, each of the electromagnets 123a-123h in fact replaces one permanent magnet 23a-23h, respectively. While in operation, the core of each electromagnet practically functions as a magnet with N-S poles, and functionally replaces a corresponding permanent magnet in the "solenoid-permanent magnets type motors".

It should be noted that the manner of providing current to the electromagnets via brushes and strips 144 and 145, respectively, as shown in FIG. 4 is only one example. Other devices and techniques well known in the art may alternatively be used.

In order for each electromagnet to function similar to a respective permanent magnet of the motors of FIGS. 1-3, a DC current has to be provided from the power supply 146.

Alternatively, the power supply 146 may provide timely alternating current to the electromagnets 123 (via the brushes 147a and 147b), to cause periodical alteration of the N-S poles of the cores of the electromagnets. Therefore, in such a manner, instead of periodically alternating the poles of the solenoid cores, in this latter embodiment the poles of the rotor electromagnets is altered.

Figure 5:
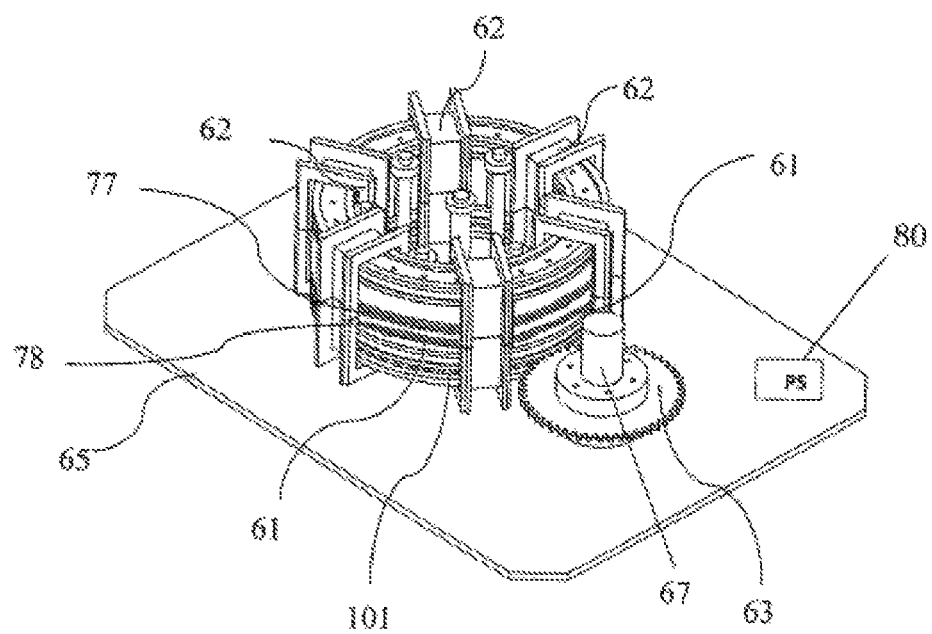
FIG. 5 shows a rotor for a solenoid-electromagnet type motor according to a second embodiment of the present invention.

FIG. 5 shows how the motor of FIG. 1 (i.e., the motor of WO 2013/140400) is modified to include electromagnets rather than permanent magnets. Each of the permanent magnets 61 of FIG. 1 is replaced by a corresponding electromagnet (not shown in FIG. 5, for the sake of brevity). Each of said electromagnets comprises one or more coils (not shown in the figure for the sake of brevity) that are wound around an iron core. As is conventional, each coil has two ends, negative and positive, respectively. In similarity to the motor of FIG. 4, all of the positive ends of the coils of the electromagnets are connected together to a peripheral "positive" metal strip 77, and similarly all of the negative ends of the coils of the electromagnets are connected together to a peripheral "negative" metal strip 78. In such a manner, all the coils of the electromagnets are in fact connected in parallel. The current supply to the electromagnets of the rotating motor is provided from power supply via a pair of conventional brushes (not shown) in an arrangement similar to the arrangement of FIG. 4. More specifically, a "positive" brush is continuously in contact with the positive strip 77, while a negative brush is continuously in contact with the negative strip 78. In such a manner, each of the electromagnets of the rotor in fact replaces one permanent magnet 61 of the motor of FIG. 1, respectively. While in operation, the core of each electromagnet practically functions as a magnet with N-S poles, and functionally replaces a corresponding permanent magnet in the "solenoid-permanent magnets type motors". The current to the electromagnets may be either DS or AC, as explained above with respect to the motor of FIG. 4.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. An electric motor comprising:
   (A) a ring-like rotor which comprises:
      a. a plurality of electromagnets that are equi-angularly spaced and equi-radially disposed in a ring-like manner; and,
   B) a stator which comprises:
      b. a plurality of solenoids that are equi-angularly spaced and equi-radially disposed, each of said solenoids having a solenoid core, which in turn has a rectangular shape in cross-section, and a cavity; and,
      c. a solenoid coil within each of said solenoids,
   wherein said electromagnets are arranged such that they can move through said cavities of the solenoid cores in a rotational manner, wherein negative and positive coil ends, respectively, of the plurality of said electromagnets are connected in parallel to respective negative and positive metal peripheral strips, and wherein current to said electromagnet coils is supplied from a power supply via two brushes, respectively that are in contact with said negative and positive strips.

2. A motor according to claim 1, wherein the rotor is a multi-layer rotor, wherein one of the layers is a tooth-ring, and wherein a rotational moment from the rotor is conveyed from the tooth ring to a gear, to which a shaft is rigidly attached.

3. A motor according to claim 1, wherein the plurality of electromagnets are mounted on a rotational disk which is in turn co-centric with a shaft, wherein said rotational disk is positioned and rotatable within respective openings on a radially inside portion of each of the solenoids.

4. A motor according to claim 1, wherein the current from the power supply to the electromagnet coils is a DC current, while a current to the solenoid coils is alternating current.

5. A motor according to claim 1, wherein the current from the power supply to the electromagnet coils is alternating current, while the current to the solenoid coils is a DC current.

* * * * *